United States Patent
Pejathaya

(10) Patent No.: US 7,503,099 B2
(45) Date of Patent: Mar. 17, 2009

(54) MEMORY MECHANISM FOR AN ADJUSTMENT MECHANISM

(75) Inventor: Srinivas Pejathaya, St. Clair Shores, MI (US)

(73) Assignee: Fisher Dynamics Corporation, St. Clair Shores, MI (US)

( * ) Notice: Subject to any disclaimer, the term of this patent is extended or adjusted under 35 U.S.C. 154(b) by 68 days.

(21) Appl. No.: 11/586,348

(22) Filed: Oct. 25, 2006

(65) Prior Publication Data

US 2007/0102981 A1 May 10, 2007

Related U.S. Application Data

(60) Provisional application No. 60/730,107, filed on Oct. 25, 2005.

(51) Int. Cl.
*E05D 11/10* (2006.01)

(52) U.S. Cl. .................. 16/324; 297/374; 297/378.12

(58) Field of Classification Search .................. 16/324, 16/325; 297/378.1, 362, 365, 374, 366, 341, 297/378.12, 361.1
See application file for complete search history.

(56) References Cited

U.S. PATENT DOCUMENTS

| | | | |
|---|---|---|---|
| 3,953,069 A * | 4/1976 | Tamura et al. .............. 297/367 |
| 5,660,440 A | 8/1997 | Pejathaya |
| 5,769,493 A | 6/1998 | Pejathaya |
| 5,788,330 A * | 8/1998 | Ryan ...................... 297/378.12 |
| 5,823,622 A | 10/1998 | Fisher, IV et al. |
| 5,918,939 A | 7/1999 | Magadanz |
| 5,927,809 A * | 7/1999 | Tame ......................... 297/341 |
| 5,947,560 A | 9/1999 | Chen |
| 5,979,986 A | 11/1999 | Pejathaya |
| 6,095,609 A | 8/2000 | Magadanz |
| 6,106,067 A * | 8/2000 | Zhuang et al. ........... 297/361.1 |
| 6,161,899 A * | 12/2000 | Yu ......................... 297/378.12 |
| 6,199,953 B1 * | 3/2001 | Chen ......................... 297/367 |
| 6,250,704 B1 * | 6/2001 | Garrido ................... 296/65.05 |
| 6,328,381 B1 * | 12/2001 | Smuk ........................ 297/365 |
| 7,025,422 B2 | 4/2006 | Fast |
| 7,097,253 B2 | 8/2006 | Coughlin et al. |
| 7,121,624 B2 * | 10/2006 | Pejathaya et al. ...... 297/378.12 |
| 7,198,330 B2 * | 4/2007 | Wahlen et al. ............. 297/374 |
| 7,296,857 B2 * | 11/2007 | Shinozaki et al. ........... 297/365 |
| 7,300,109 B2 * | 11/2007 | Hofmann et al. ........... 297/362 |
| 2005/0253439 A1 * | 11/2005 | Sasaki et al. ............. 297/378.1 |

* cited by examiner

*Primary Examiner*—Victor Batson
*Assistant Examiner*—Matthew Sullivan
(74) *Attorney, Agent, or Firm*—Harness, Dickey & Pierce, P.L.C.

(57) ABSTRACT

A memory mechanism for an adjustment mechanism includes a housing, a release lever supported by the housing that positions the adjustment mechanism in a latched position and an unlatched position, and a disk supported by the housing and movable relative to the housing. A slide lever is supported by the housing between an extended position and a retracted position and extends from the disk in the extended position to define a position of the disk relative to the housing.

26 Claims, 9 Drawing Sheets

MEMORY MECHANISM FOR AN ADJUSTMENT MECHANISM

CROSS-REFERENCE TO RELATED APPLICATIONS

This application claims the benefit of U.S. Provisional Application No. 60/730,107, filed on Oct. 25, 2005. The disclosure of the above application is incorporated herein by reference.

FIELD

The present teachings relate to memory mechanisms and more particularly to an improved memory mechanism for an adjustment mechanism.

BACKGROUND

Minivans and sport utility vehicles are becoming increasingly popular and typically provide a flexible seating system capable of accommodating various seating and storage configurations. Such seating systems provide users with the ability to vary a location of a seat within a vehicle and/or to otherwise adjust the seat between a recline position, a fold-flat position, a dumped position, and/or a kneeled position.

Such seat assemblies generally include an inboard recliner mechanism and an outboard recliner mechanism that cooperate to allow selective rotation of a seatback relative to a seat bottom. The outboard mechanism is usually tied to a manual lever or a power-actuated lever such that when a force is applied to the lever, the outboard mechanism is released. The rotational force applied to the outboard mechanism rotates a cross rod that extends generally between the outboard mechanism and the inboard mechanism to cause the inboard mechanism to similarly release. Once the outboard and inboard recliner mechanisms are released, the seatback is permitted to rotate relative to the seat bottom.

Releasing the inboard and outboard recliner mechanisms may be used to position the seatback into a fold-flat position relative to the seat bottom such that the seatback is generally parallel to the seat bottom. Manipulation of the seatback into the fold-flat position may be timed with forward articulation of the seat to permit quick and easy access to an area generally behind the seat. Such quick entry systems are commonly used in minivan and sport utility vehicles to allow access to seating behind the seat and/or to a cargo area of the vehicle. In either situation, when the seat is returned to a use position from the forward position, the seat is articulated rearward until the seat bottom is returned to a use position. Once the seat bottom is returned to the use position, the seatback is rotated relative to the seat bottom until the inboard and outboard recliner mechanisms lock the seatback relative to the seat bottom.

Conventional recliner mechanisms are typically biased into a latched position such that when the seatback is rotated from the fold-flat position, the recliner mechanism engages the seatback and prevents further rearward rotation of the seatback relative to the seat bottom. In essence, the recliner mechanism locks the seatback in a forward-most position, preventing further angular adjustment of the seatback relative to the seat bottom until the recliner mechanism is released once again.

The forward-most position of the seatback does not typically provide a desirable seating position as the forward-most position usually results in the seatback being generally perpendicular to the seat bottom. Therefore, in locking the seatback in the forward-most position, conventional recliner mechanisms suffer from the disadvantage of requiring an additional operation (i.e., releasing the recliner mechanism) before the seatback can be returned to a reclined and comfortable seating position.

SUMMARY

A memory mechanism for an adjustment mechanism includes a housing, a release lever supported by the housing that positions the adjustment mechanism in a latched position and an unlatched position, and a disk supported by the housing and movable relative to the housing. A slide lever is supported by the housing between an extended position and a retracted position and extends from the disk in the extended position to define a position of the disk relative to the housing.

An adjustment mechanism includes a first component, a second component selectively movable relative to the first component, a locking mechanism associated with the first component and the second component that selectively prevents movement of the second component relative to the first component in a latched position and permits movement of the second component relative to the first component in an unlatched position, and a release lever that positions the locking mechanism in the latched position and the unlatched position. A disk moves in response to movement of the second component relative to the first component and a slide lever moves between an extended position and a retracted position. The slide lever extends from the disk in the extended position when the locking mechanism in the unlatched position to define a first position of the disk relative to the first component.

Further areas of applicability of the present teachings will become apparent from the detailed description provided hereinafter. It should be understood that the detailed description and specific examples are intended for purposes of illustration only and are not intended to limit the scope of the teachings.

BRIEF DESCRIPTION OF THE DRAWINGS

The present teachings will become more fully understood from the detailed description and the accompanying drawings, wherein.

DETAILED DESCRIPTION

Figure 1:
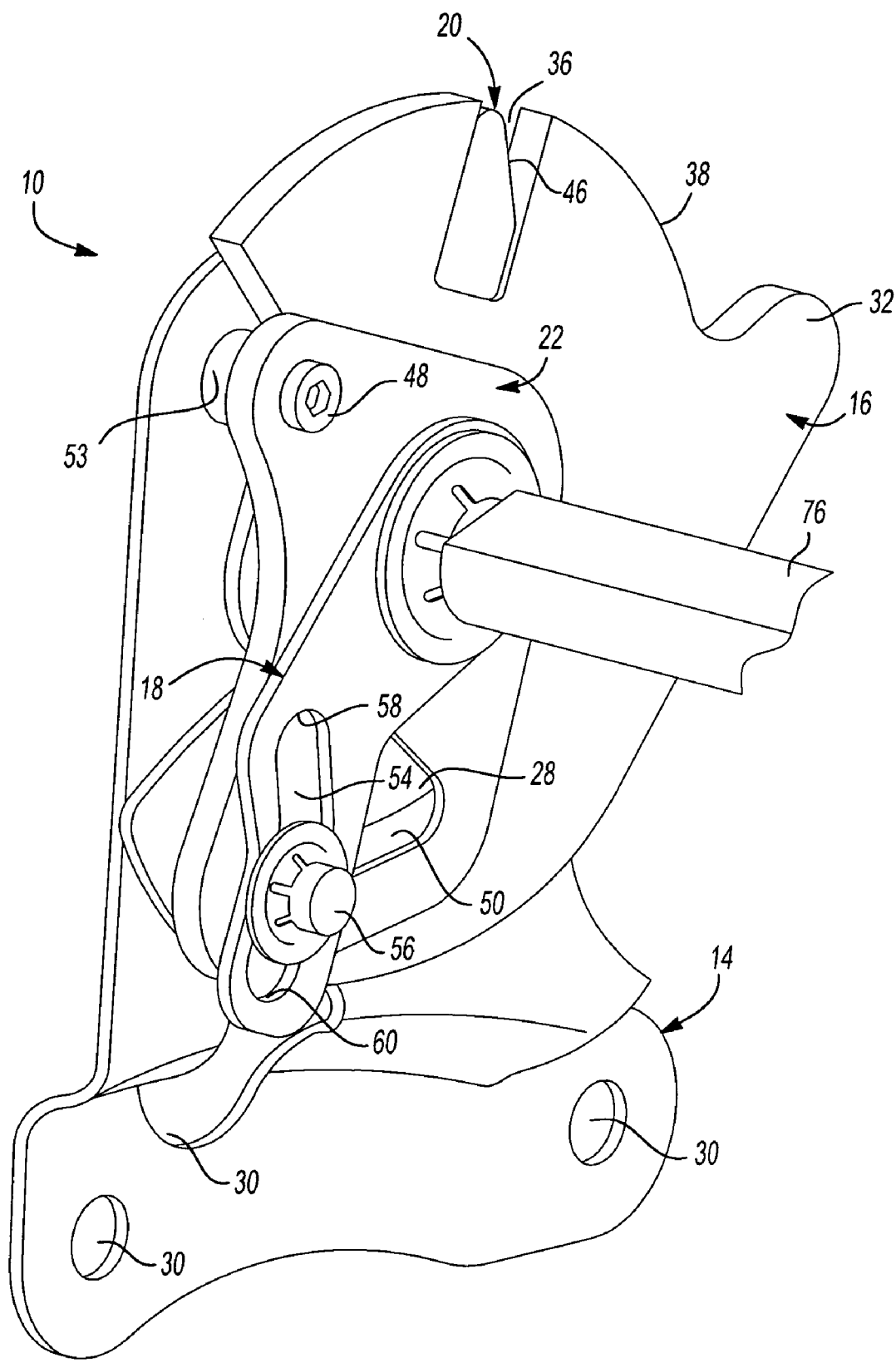
FIG. 1 is a perspective view of a memory mechanism for use with a seat adjustment mechanism.

The following description is merely exemplary in nature and is in no way intended to limit the teachings, application, or uses.

With reference to the figures, a memory mechanism 10 for use with a seat adjustment mechanism such as a recliner mechanism 12 (FIGS. 6-10) is provided and includes a housing plate 14, a trap disk 16, a release lever 18, a slide lever 20, and a stationary plate 22. The release lever 18 selectively positions the recliner mechanism 12 between a latched position and an unlatched position and cooperates with the trap disk 16 to prevent the recliner mechanism 12 from returning to the latched position from the unlatched position until the recliner mechanism 12 has been sufficiently rotated relative to the trap disk 16. The recliner mechanism 12 is preferably of the type disclosed in assignee's commonly-owned U.S. patent application Ser. No. 11/197,740, filed Aug. 3, 2005, the disclosure of which is hereby incorporated by reference. While the memory mechanism 10 will be described hereinafter and shown in the drawings as being associated with a round recliner mechanism, the memory mechanism 10 may be used with any type of recliner mechanism and any type of adjustment mechanism, such as, but not limited to, an armrest assembly or a headrest assembly.

Figure 2:
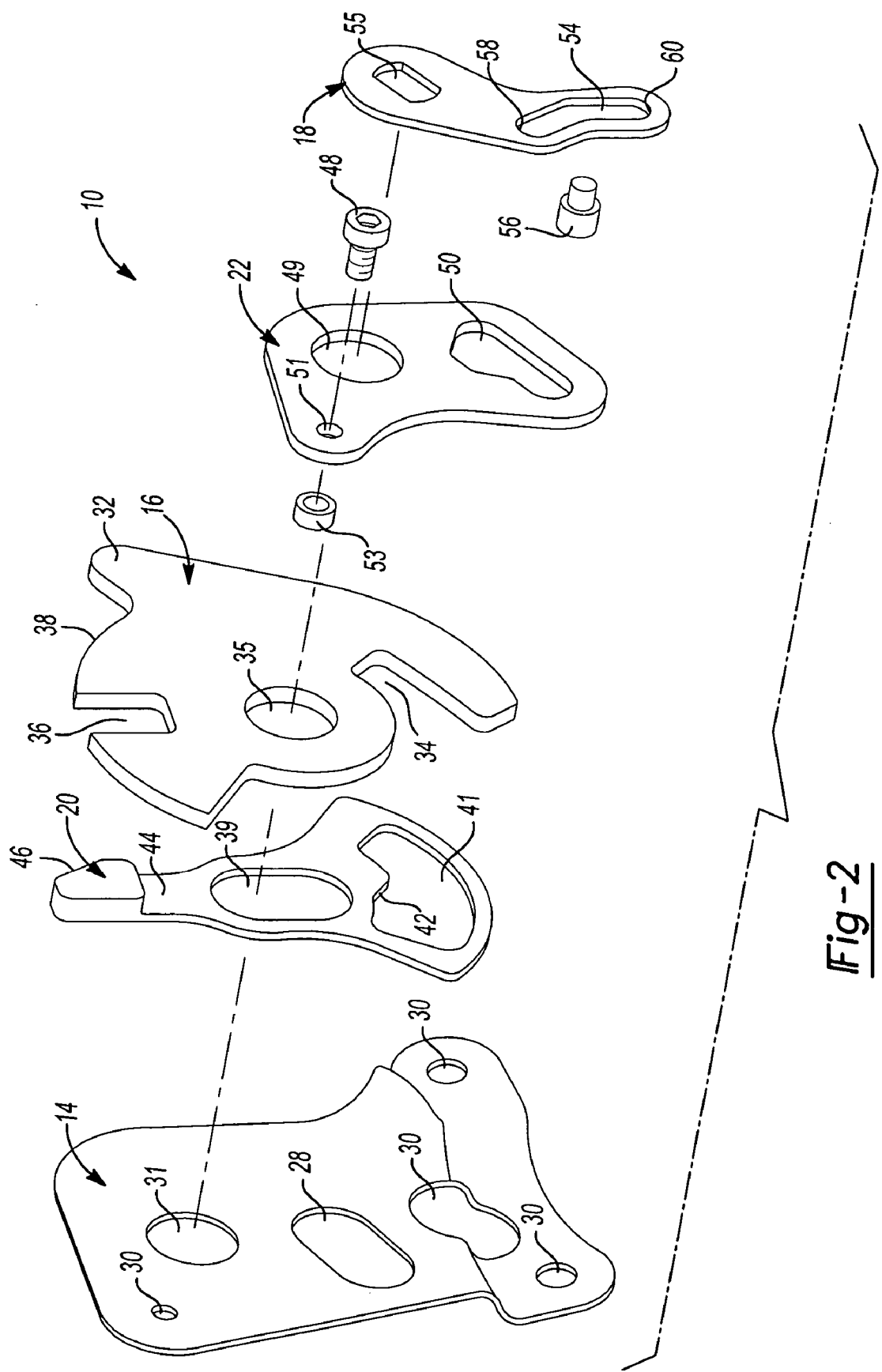
FIG. 2 is an exploded view of the memory mechanism of FIG. 1.
Figure 6:
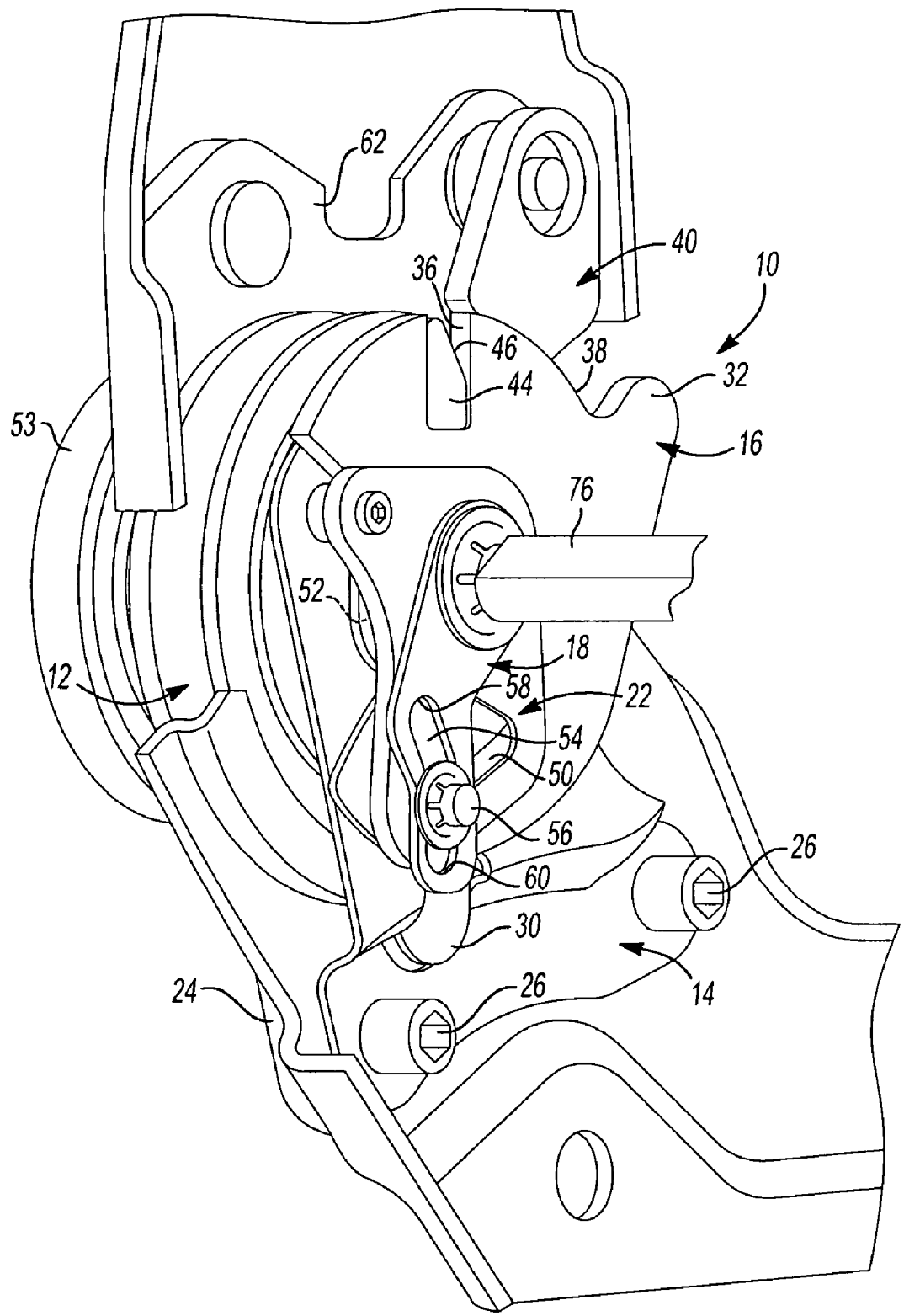
FIG. 6 is a perspective view of the memory mechanism of FIG. 1 in a locked state and coupled to a seat adjustment mechanism and a seat assembly.
Figure 7:
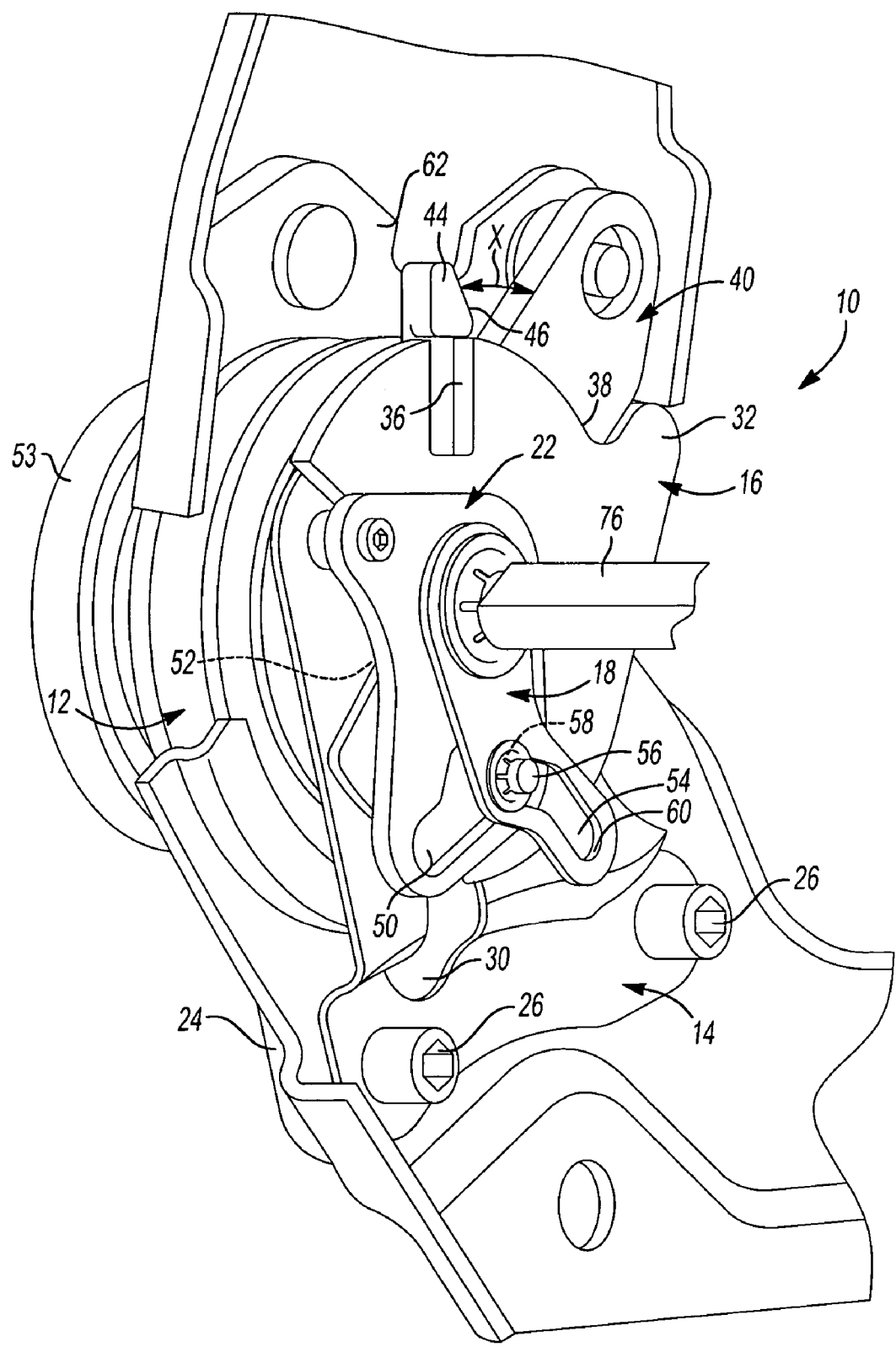
FIG. 7 is a perspective view of the memory mechanism of FIG. 1 in an unlocked state and coupled to a seat adjustment mechanism and a seat assembly.
Figure 8:
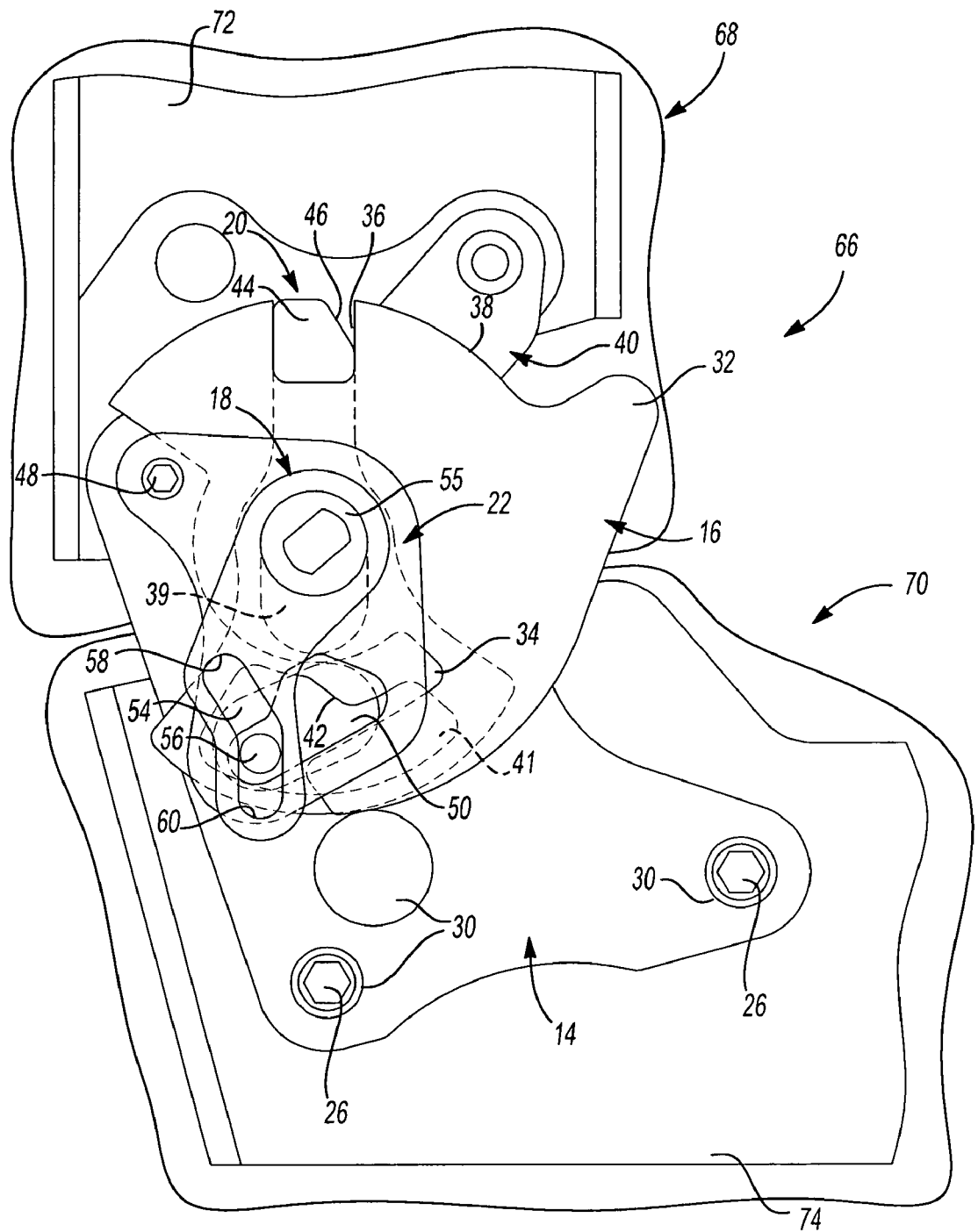
FIG. 8 is a side view of the memory mechanism of FIG. 1 in a locked state and coupled to a seat adjustment mechanism and a seat assembly with a seatback of the seat assembly in a use position.
Figure 9:
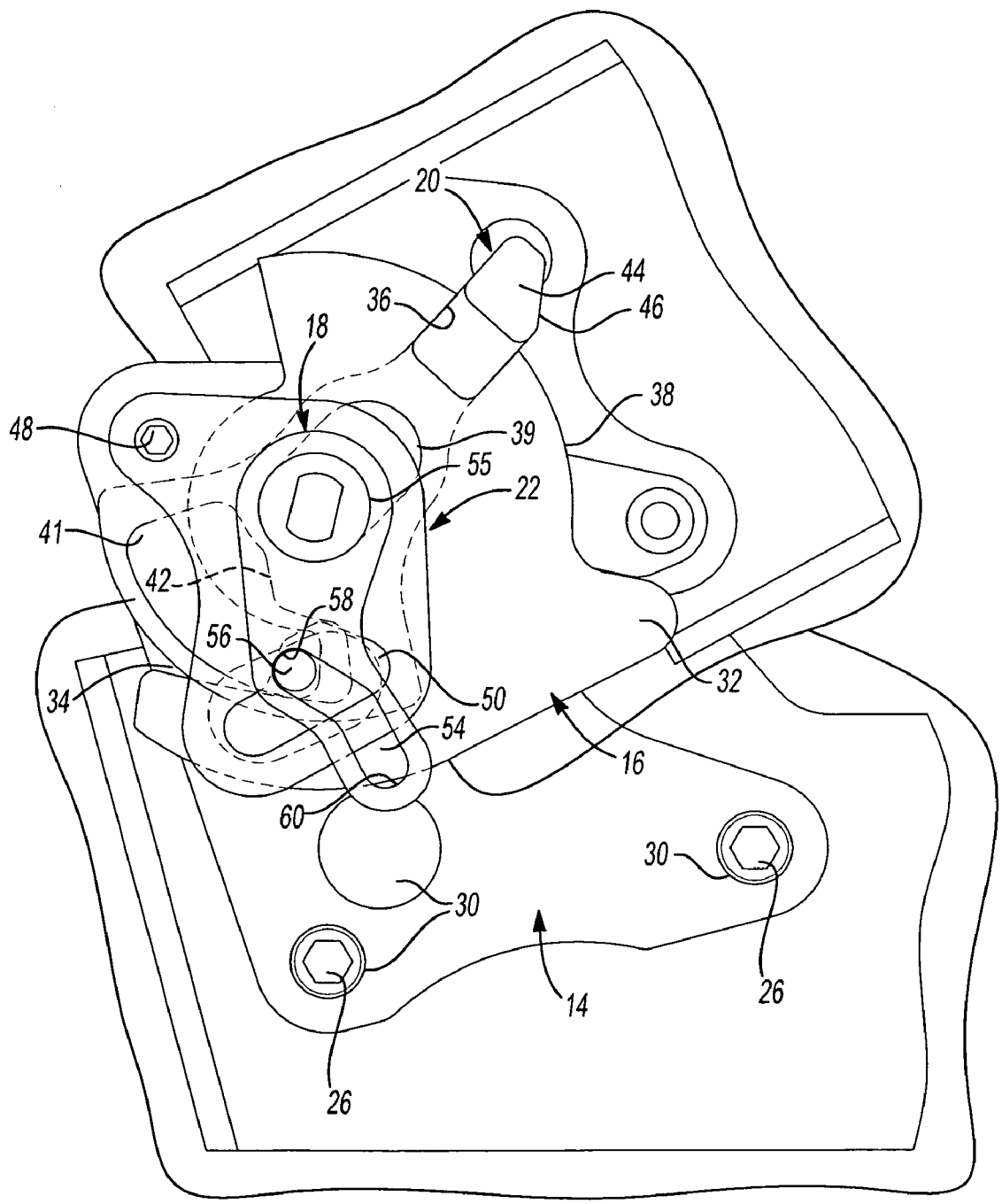
FIG. 9 is a side view of the memory mechanism of FIG. 1 in an unlocked state and coupled to a seat adjustment mechanism and a seat assembly with a seatback of the seat assembly in a fold-flat position.
Figure 10:
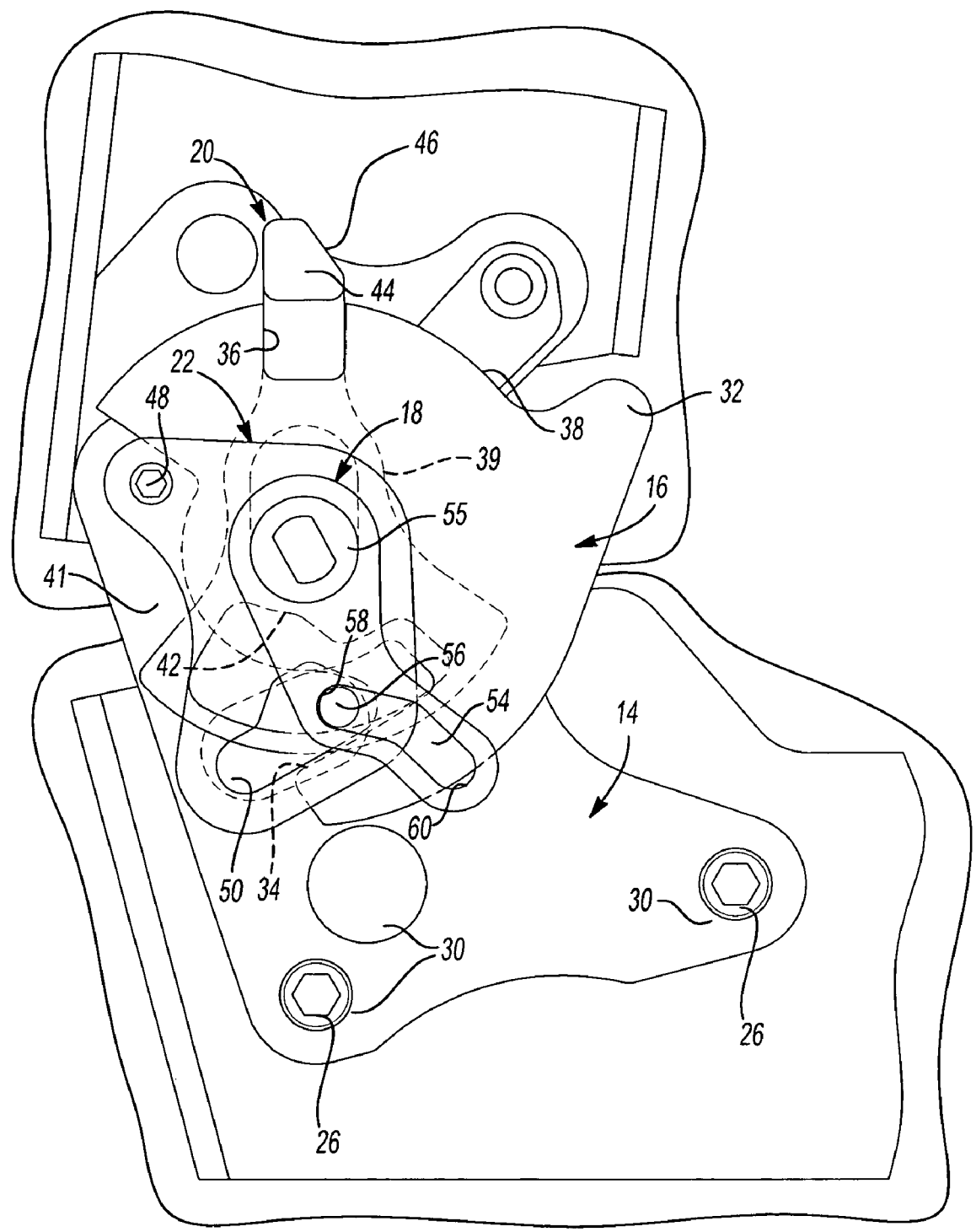
FIG. 10 is a side view of the memory mechanism of FIG. 1 in an unlocked state and coupled to a seat adjustment mechanism and a seat assembly with a seatback of the seat assembly in an intermediate position.

With reference to FIGS. 6 and 7, the housing plate 14 is shown fixedly attached to a lower housing plate 24 of the recliner mechanism 12 by a series of fasteners 26 and includes a central aperture 28 and a series of attachment apertures 30, 31 (FIG. 2). The fasteners 26 are received by apertures 30 located at a bottom portion of the housing plate 14 to fixedly attach the housing plate 14 to the recliner mechanism 12 while aperture 31, located at an upper portion of the housing plate 14, may be used to attach the other components 16, 18, 20, 22 of the memory mechanism 10 to the housing plate 14. The above relationship allows the memory mechanism 10 to be attached to virtually any adjustment mechanism simply by adapting the shape of the housing plate 14 and the location of the attachment apertures 30 to the shape of and configuration of the adjustment mechanism. As such, the memory mechanism 10 may be retrofitted to an existing adjustment mechanism to provide the adjustment mechanism with a memory feature.

The trap disk 16 is rotatably supported by the housing plate 14 and includes an extension 32, a trap recess 34, a central aperture 35, and a slide recess 36. An arcuate surface 38 extends generally between the extension 32 and the slide recess 36 for interaction with a cam 40 of the recliner mechanism 12. The trap disk 16 is rotatably attached to the housing plate 14 at central aperture 35 and may be rotated about central aperture 35 relative to the housing plate 14.

The slide lever 20 is slidably and rotatably supported generally between the trap disk 16 and the housing plate 14 and includes a slot 39, an aperture 41, and an extension 44. The slot 39 rotatably and slidably attaches the slide lever 20 to the housing plate 14 and allows the slide lever 20 to both rotate and translate relative to the housing plate 14. The aperture 41 is disposed on an opposite side of the slot 39 from the extension 44 and includes an engagement surface 42. The extension 44 is disposed on an opposite side of the slot 39 from the aperture 41 and is slidably received within the slide recess 36 of the trap disk 16. The extension 44 includes a ramped surface 46 that selectively extends from trap disk 16 for engagement with the cam 40 of the recliner mechanism 12.

Figure 5:
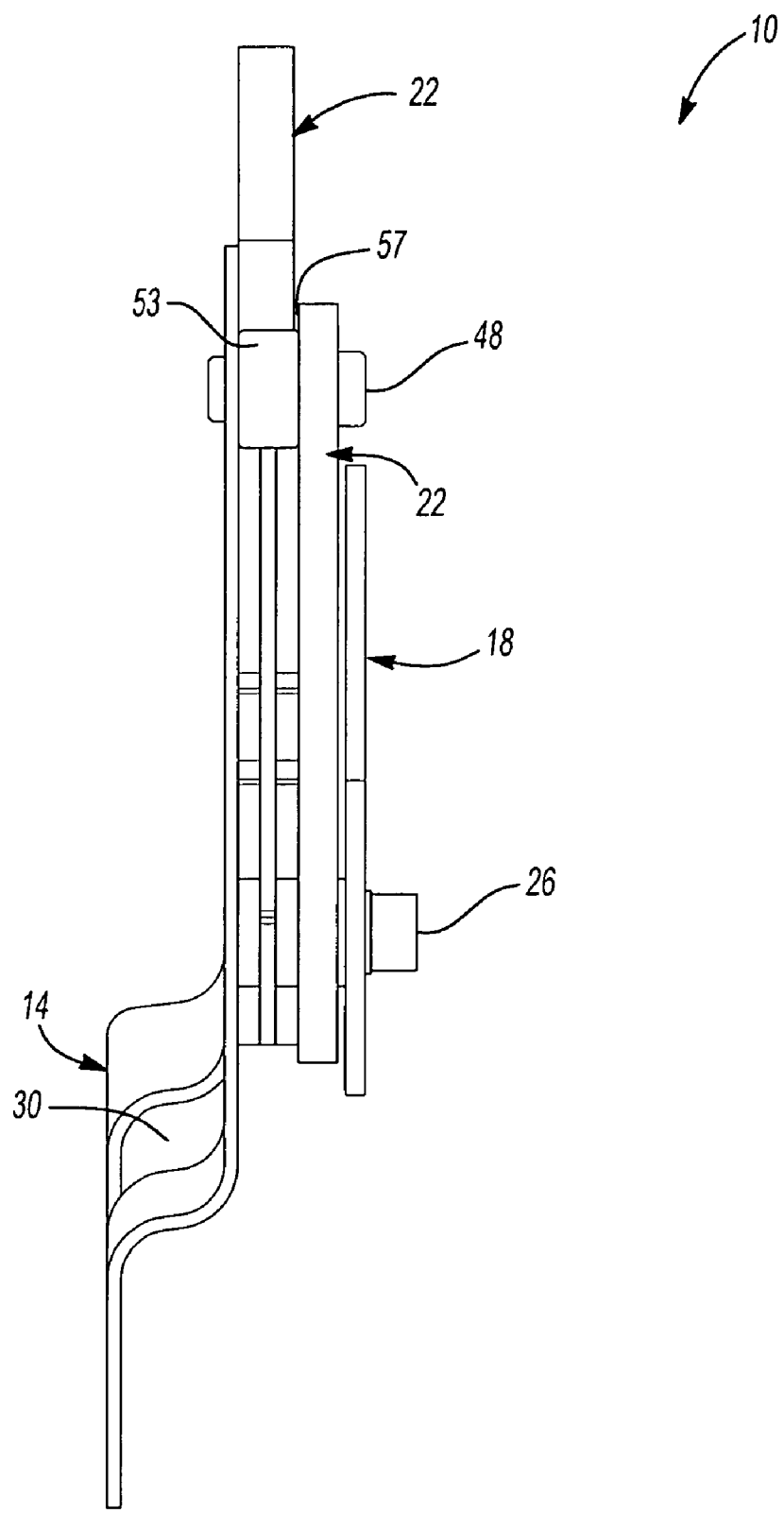
FIG. 5 is an end view of the memory mechanism of FIG. 1.

The stationary plate 22 is fixedly attached to the housing plate 14 and includes an attachment aperture 49 and a central recess 50. A fastener 48 is received within an attachment aperture 51 of the stationary plate 22 to fixedly attach the stationary plate 22 to the housing plate 14 and a spacer 53 is positioned between the housing plate 14 and the stationary plate 22 to define a clearance 57 therebetween (FIG. 5). The clearance 57 is formed generally between the stationary plate 22 and the housing plate 14 to allow the trap disk 16 to rotate and the slide lever 20 to rotate and translate relative to the housing plate 14 and stationary plate 22.

The release lever 18 is keyed to a locking mechanism of the recliner mechanism 12 such as a cam 52 and includes a peanut slot 54, a keyed aperture 55, and a pin 56. The keyed aperture 55 is coupled to the cam 52 of the recliner mechanism 12 such that rotation of the release lever 18 causes concurrent rotation of the cam 52 and release of the recliner mechanism 12 into an unlatched position. The pin 56 is slidably received within the peanut slot 54 and is free to move between a first end 58 of the slot 54 and a second end 60 of the slot 54. The pin 56 is also received within the central recess 50 of the stationary plate 22 such that the overall movement of the pin 56 relative to the lower housing plate 24 is confined to the outer boundaries of the central recess 50.

The release lever 18 is fixed for rotation with the cam 52 via the keyed aperture 55 such that rotation of the release lever 18 causes concurrent rotation of the cam 52 associated with the recliner mechanism 12. Rotation of the cam 52 causes the recliner mechanism 12 to be toggled between a latched position and an unlatched position, depending on the direction of rotation. When the recliner mechanism 12 is positioned into the unlatched position, an upper housing plate 62 is permitted to rotate relative to the lower housing plate 24 (FIG. 7). When the recliner mechanism 12 is positioned into the latched position, the upper housing plate 62 is prevented from rotating relative to the lower housing plate 24 (FIG. 6). Because the release lever 18 is coupled to the cam 52, controlling rotation of the release lever 18 controls the state of the recliner mechanism 12 (i.e., latched or unlatched).

Figure 4:
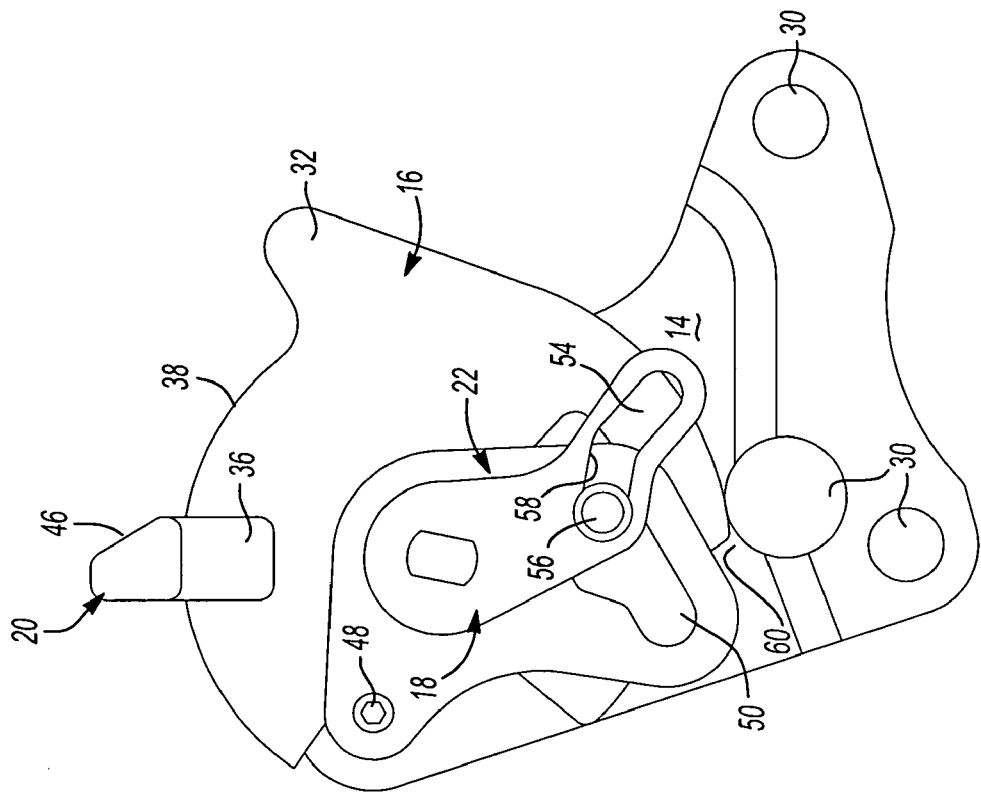
FIG. 4 is a side view of the memory mechanism of FIG. 1 in second position.

With particular reference to FIGS. 1 and 4, operation of the memory mechanism 10 will be described in detail. When the recliner mechanism 12 is in the locked position, the upper housing plate 62 is fixed relative to the lower housing plate 24. To allow rotation of the upper housing plate 62 relative to the lower housing plate 24, a force is initially applied to the release lever 18 to rotate the release lever 18 relative to the housing plate 14 and in the counterclockwise direction relative to the view shown in FIG. 1.

Figure 3:
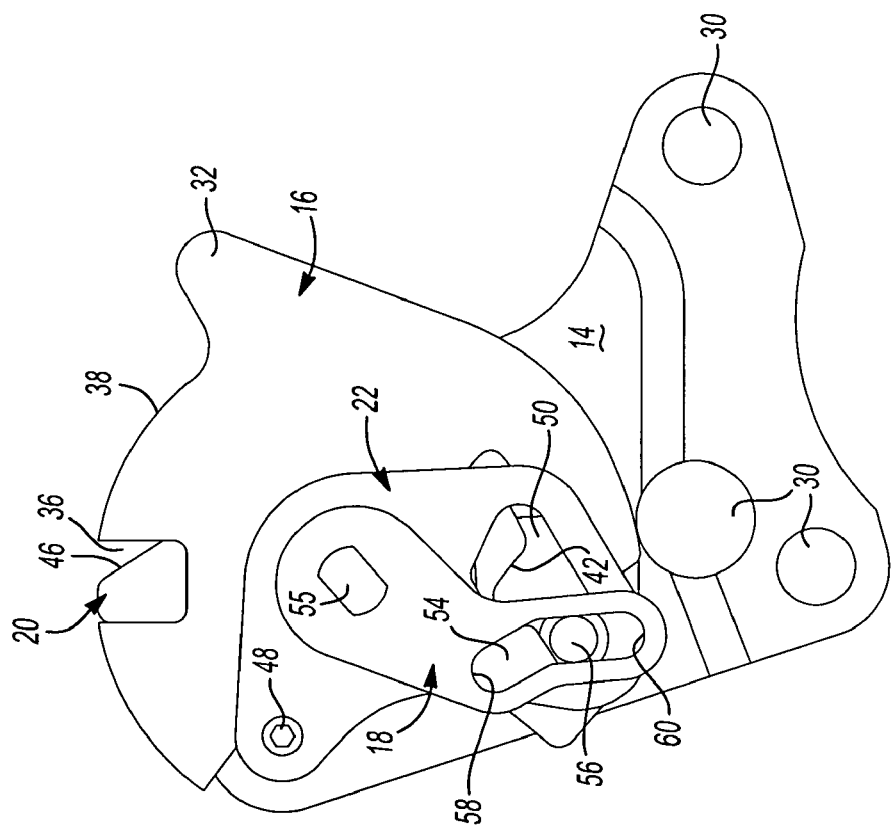
FIG. 3 is a side view of the memory mechanism of FIG. 1 in a first position.

Rotation of the release lever 18 causes the pin 56 to traverse the slot 54 and move generally from the second end 60 of the slot 54 to the first end 58 of the slot 54. Because the release lever 18 is rotating in the counterclockwise direction relative to the view shown in FIG. 1, the slot 54 moves from a generally vertical position (FIG. 3) to a generally horizontal position (FIG. 4). Rotation of the release lever 18 from the vertical position to the horizontal position causes the pin 56 to move up relative to the central recess 50 of the stationary plate 22 and contact the slide lever 20.

The pin 56 contacts the slide lever 20 generally at the engagement surface 42 and causes the slide lever 20 to move relative to the trap disk 16. Specifically, the slide lever 20 is permitted to move relative to the housing plate 14 and stationary plate 22 due to the oblong shape of the slot 39, which provides clearance for such movement. Movement of the slide lever 20 relative to the housing plate 14 and stationary plate 22 causes the extension 44 of the slide lever 20 to extend from the arcuate surface 38 of the trap disk 16.

Sufficient rotation of the release lever 18 in the counterclockwise direction relative to the view shown in FIG. 1 causes the cam 52 of the recliner mechanism 12 to disengage and move the recliner mechanism 12 into the unlatched position, thereby permitting rotation of the upper housing plate 62 relative to the lower housing plate 24. Once the recliner mechanism 12 is in the unlatched position, the upper housing plate 62 may be rotated relative to the lower housing plate 24. The upper housing plate 62 may be rotated in the clockwise direction relative to the view shown in FIG. 1 until the upper housing plate 62 is positioned in a fold-flat/forward-most position or is positioned in an easy-entry position allowing the memory mechanism 10 and recliner mechanism 12 to be translated forward to gain access to an area behind the memory mechanism 10 and recliner mechanism 12.

As the upper housing plate 62 rotates, the cam 40 is rotated concurrently therewith. Sufficient rotation of the upper housing plate 62 relative to the lower housing plate 24 causes the cam 40 to engage the extension 32 of the trap disk 16 and rotate the trap disk 16 with the upper housing plate 62 in the clockwise direction relative to the view shown in FIG. 1 until the upper housing plate 62 is in the fold-flat or easy entry position. Once in the fold-flat or easy-entry position, the upper housing plate 62 is prevented from further rotating in the clockwise direction.

As the trap disk 16 is rotated in the clockwise direction relative to the view shown in FIG. 1, the trap recess 34 engages the moving pin 56 to lock the pin 56 against the engagement surface 42 of the slide lever 20. Engagement between the trap recess 34 of the trap disk 16, the slot 54 of the release lever 18, and the engagement surface 42 of the slide lever 20, prevents further movement of the pin 56 and, thus, the release lever 18, relative to the stationary plate 22. In this position, the recliner mechanism 12 is prevented from returning to the latched position until the pin 56 and release lever 18 are permitted to move relative to the stationary plate 22 once again.

To return the recliner mechanism 12 to the latched position, a force is applied to the upper housing plate 62 to rotate the upper housing plate 62 in the counterclockwise direction relative to the view shown in FIG. 1. Rotation of the upper housing plate 62 in the counterclockwise direction relative to the view shown in FIG. 1 causes concurrent rotation of the cam 40 relative to the lower housing plate 24. The travel of the cam 40 generally mimics the shape of the arcuate surface 38 and may even ride along the arcuate surface 38 as the upper housing plate 62 is rotated in the counterclockwise direction relative to the view shown in FIG. 1.

Sufficient rotation of the upper housing plate 62 in the counterclockwise direction relative to the view shown in FIG. 1, causes the cam 40 to disengage the extension 32 of the trap disk 16 and travel along the arcuate surface 38. At this point, the cam 40 does not cause rotation of the trap disk 16 as the trap disk 16 remains stationary with the pin 56 securely held against the engagement surface 42 of the slide lever 20.

Once the upper housing plate 62 is sufficiently rotated in the counterclockwise direction relative to the view shown in FIG. 1, the cam 40 of the upper housing plate 62 contacts the ramped surface 46 of the slide lever 20. Contact between the cam 40 of the upper housing plate 62 and the ramped surface 46 of the slide lever 20 causes the slide lever 20 to rotate the trap disk 16 with the upper housing plate 62 and causes the slide lever 20 to retract into the trap disk 16 such that a tip 64 of the slide lever 20 is either flush with, or recessed from, the arcuate surface 38 of the trap disk 16. Movement of the slide lever 20 (i.e., translation relative to the stationary plate 22 and housing plate 14) causes the engagement surface 42 of the slide lever 20 to apply a force on the pin 56 and rotate the release lever 18 in the clockwise direction relative to the view shown in FIGS. 3 and 4. Such rotation of the trap disk 16 in the counterclockwise direction relative to the view shown in FIG. 1 with the upper housing plate 62 also causes the trap recess 34 to disengage the pin 56 at approximately the same time the slide lever 20 rotates the release lever 18.

Movement of the pin 56 from the first end 58 of the slot 54 to the second end 60 of the slot 54 causes rotation of the release lever 18 in the clockwise direction relative to the view shown in FIG. 1. When the release lever 18 is rotated sufficiently in the clockwise direction relative to the view shown in FIG. 1, the cam 52 of the recliner mechanism 12 is similarly rotated and returns the recliner mechanism 12 to the latched position. The release lever 18 is rotated under a force exerted on the release lever 18 by the recliner mechanism 12 as the recliner mechanism 12 is biased into the latched position by a coil spring 53.

The distance between the extension 32 of the trap disk 16 and the cam 40 generally dictates when the recliner mechanism 12 is returned to the latched position, and is generally represented as "X" in FIG. 7. Therefore the distance "X" dictates at what angle the upper housing plate 62 is positioned relative to the lower housing plate 24.

The distance X is the required distance the upper housing plate 62 is required to travel in the counterclockwise direction relative to the view shown in FIG. 1 from the fold-flat position or easy-entry position (i.e., when the cam 40 of the upper housing plate 62 is in contact with the extension 32 of the trap disk 16) before contacting the slide lever 20 and being returned to the latched position. Contact between the cam 40 and the ramped surface 46 of the slide lever 20 causes the slide lever 20 to translate relative to the housing plate 14 due to engagement between the ramped surface 46 of the slide lever 20 and the cam 40. Because the slide lever 20 is not immediately retracted into the trap disk 16 upon contact with the cam 40, the cam 40 also rotates the slide lever 20 and trap disk 16 relative to the housing plate 14 while concurrently translating the slide lever 20 relative to the housing plate 14. Such rotation of the trap disk 16 and slide lever 20 relative to the housing plate 14 by the cam 40 allows the upper housing plate 62 to be positioned into an angled and usable position relative to the lower housing plate 24.

Increasing the distance X results in the upper housing plate 62 having to travel a greater distance in the counterclockwise direction relative to the view shown in FIG. 1 prior to being returned to the latched position while decreasing the distance X results in the upper housing plate 62 having to travel a shorter distance in the counterclockwise direction relative to the view shown in FIG. 1 prior to being returned to the latched position. Therefore, adjusting the distance X adjusts the return angle of the upper housing plate 62 relative to the lower housing plate 24.

With particular reference to FIG. 5, the memory mechanism 10 and recliner mechanism 12 are shown incorporated into a seat assembly 66. The seat assembly 66 includes a seatback 68 rotatably supported by a seat bottom 70. The seatback 68 includes a seat frame 72 attached thereto while the seat bottom 70 similarly includes a seat frame 74 attached thereto. The seat assembly 66 may also include a cross rod 76 that extends between an inboard recliner mechanism 12 and an outboard recliner mechanism 12. The cross rod 76 releases one of the recliner mechanisms 12 when the other recliner mechanism 12 is released, thereby allowing a force to be applied to only one of the inboard or outboard recliner mechanisms 12 and timing the release of both recliner mechanisms12 to permit the seatback 68 to rotate relative to the seat bottom 70.

When the recliner mechanism 12 is unlatched, rotation of the upper housing plate 62 causes concurrent rotation of the seat frame 72 and seatback 68. When the upper housing plate 62 is rotated into the fold-flat position, the seatback 68 may be positioned generally parallel to the seat bottom 70. When the upper housing plate 62 is rotated to the easy-entry position (i.e., generally between the use position and the fold-flat position), the seatback 68 may be positioned at a forward angle relative to the seat bottom 70 to permit access to an area generally behind the seat assembly 66. To return the seatback 68 to an upright and usable position from either the fold-flat position or the easy-entry position, a force is applied to the seatback 68 to rotate the seatback 68 in the counterclockwise direction relative to the view shown in FIG. 1. Rotation of the seatback 68 in the counterclockwise direction causes the upper housing plate 62 to similarly rotate in the counterclockwise direction.

As described above, the recliner mechanism 12 is not returned to the latched position until the cam 40 disengages the extension 32 of the trap disk 16, travels the distance X, engages the ramped surface 46 of the slide lever 20, and causes the slide lever 20 to rotate and translate relative to the housing plate 14. As descried above, sufficient translation of the slide lever 20 relative to the housing plate 14 causes rotation of the release lever 18 and movement of the recliner mechanism 12 into the latched position. Once returned to the latched position, the angular position of the seatback 68 is fixed relative to the seat bottom 70 until the recliner mechanism 12 is once again positioned in the unlatched state.

The angle at which the seatback 68 is positioned relative to the seat bottom 70 is determined based on the distance X. The seatback 68 is returned to the same angular position (i.e., dictated by the distance X) relative to the seat bottom 70 due to interaction between the memory mechanism 10 and the cam 40 when returned from the fold-flat or easy-entry position.

When the distance X is great, the seatback 68 is positioned in a generally reclined position relative to the seat bottom 70 when returned to the latched position. When the distance X is relatively small, the seatback 68 is positioned in a more upright position relative to the seat bottom 70. In either configuration, the memory mechanism 10 returns the seatback 68 to the same angular relationship relative to the seat bottom 70 (i.e., the angle prior to being positioned in the fold-flat or easy-entry position) when returned from either the fold-flat position or the easy-entry position. The distance X may be adjusted to tailor the return angle between the seatback 68 and the seat bottom 70 when the seatback 68 is returned to an upright position from the fold-flat or easy-entry positions.

While the distance X is described as being adjustable to set the return angle of the seatback 68 relative to the seat bottom 70, the slide lever 20 could also be adjusted to time return of the recliner mechanism 12 to the latched position with rotation of the seatback 68. For example, the overall profile and/or ramped surface 46 may be configured such that the slide lever 20 is more or less quickly returned to the retracted position relative to the trap disk 16 when contacted by the cam 40 to more or less quickly return the recliner mechanism 12 to the latched position. Such adjustments to the slide lever 20 may be used in conjunction with or independent of adjustments to the distance X to adjust the return angle of the seatback 68 relative to the seat bottom 70.

The description of the teachings is merely exemplary in nature and, thus, variations that do not depart from the gist of the teachings are intended to be within the scope of the teachings. Such variations are not to be regarded as a departure from the spirit and scope of the teachings.

What is claimed is:

1. A memory mechanism for an adjustment mechanism, the memory mechanism comprising:
   a housing;
   a release lever supported by said housing and operable to position the adjustment mechanism in a latched position and an unlatched position;
   a disk supported by said housing and movable relative to said housing; and
   a slide lever supported by said housing between an extended position and a retracted position, said slide lever extending from an outer perimeter of said disk in said extended position to define a position of said disk relative to said housing and recessed from or flush with said outer perimeter of said disk in said retracted position.

2. The memory mechanism of claim 1, wherein said slide lever is rotatably and slidably supported by said housing.

3. The memory mechanism of claim 1, wherein said slide lever is received within a recess of said disk and is rotatable with said disk.

4. The memory mechanism of claim 1, further comprising a pin slidably supported by said release lever and movable between a first position and a second position relative to said release lever.

5. The memory mechanism of claim 4, wherein said pin moves relative to said release lever when said release lever is rotated relative to said housing to position the adjustment mechanism between said latched position and said unlatched position.

6. The memory mechanism of claim 4, wherein said pin selectively engages said slide lever to translate said slide lever relative to said housing and position said slide lever in said extended position.

7. The memory mechanism of claim 4, wherein said disk includes a recess receiving said pin when the adjustment mechanism is in said unlatched position.

8. The memory mechanism of claim 4, wherein said pin is disposed between said release lever and said disk when the adjustment mechanism is in said unlatched position to prevent rotation of said release lever and return of the adjustment mechanism to said latched position until said slide lever is returned to said retracted position.

9. The memory mechanism of claim 1, wherein said disk is movable relative to said housing when the adjustment mechanism is in said unlatched position.

10. The memory mechanism of claim 1, wherein said slide lever is in said extended position when the adjustment mechanism is in said unlatched position.

11. An adjustment mechanism comprising:
    a first component;
    a second component selectively movable relative to said first component;
    a locking mechanism associated with said first component and said second component that selectively prevents movement of said second component relative to said first component in a latched position and permits movement of said second component relative to said first component in an unlatched position;
    a release lever operable to position said locking mechanism in said latched position and said unlatched position;
    a disk movable in response to movement of said second component relative to said first component;

a slide lever movable between an extended position and a retracted position, said slide lever extending from said disk in said extended position when said locking mechanism in said unlatched position to define a first position of said disk relative to said first component; and a pin slidably supported by said release lever and movable between a first position and a second position relative to said release lever, said pin selectively engaging said slide lever to position said slide lever in said extended position.

12. The adjustment mechanism of claim 11, wherein said slide lever is rotatably and slidably supported relative to said disk.

13. The adjustment mechanism of claim 11, wherein said slide lever is received within a recess of said disk and is rotatable with said disk.

14. The adjustment mechanism of claim 11, wherein said disk includes a recess receiving said pin when said locking mechanism is in said unlatched position.

15. The adjustment mechanism of claim 11, further comprising a cam fixed for movement with said second component.

16. The adjustment mechanism of claim 15, wherein said cam contacts said disk to rotate said disk with said second component from said first position to a second position.

17. The adjustment mechanism of claim 16, wherein said cam contacts said slide lever when said second component is rotated from said second position to said first position to rotate said disk with said second component.

18. The adjustment mechanism of claim 17, wherein engagement between said cam and said slide lever causes said slide lever to move into said retracted position.

19. The adjustment mechanism of claim 18, wherein movement of said slide lever into said retracted position returns said locking mechanism to said locked position and said second component to said first position.

20. The adjustment mechanism of claim 11, wherein said slide lever is coupled to said release handle such that when said slide lever is moved into said retracted position from said extended position, said locking mechanism is returned to said locked position.

21. A memory mechanism for an adjustment mechanism, the memory mechanism comprising:

a housing;

a release lever supported by said housing and operable to position the adjustment mechanism in a latched position and an unlatched position;

a disk supported by said housing and movable relative to said housing;

a slide lever supported by said housing between an extended position and a retracted position, said slide lever extending from said disk in said extended position to define a position of said disk relative to said housing; and a pin slidably supported by said release lever and movable between a first position and a second position relative to said release lever, said pin being movable relative to said release lever when said release lever is rotated relative to said housing to position the adjustment mechanism between said latched position and said unlatched position.

22. The memory mechanism of claim 21, wherein said slide lever is rotatably and slidably supported by said housing.

23. The memory mechanism of claim 21, wherein said slide lever is received within a recess of said disk and is rotatable with said disk.

24. The memory mechanism of claim 21, wherein said pin selectively engages said slide lever to translate said slide lever relative to said housing and position said slide lever in said extended position.

25. The memory mechanism of claim 21, wherein said disk includes a recess receiving said pin when the adjustment mechanism is in said unlatched position.

26. The memory mechanism of claim 21, wherein said pin is disposed between said release lever and said disk when the adjustment mechanism is in said unlatched position to prevent rotation of said release lever and return of the adjustment mechanism to said latched position until said slide lever is returned to said retracted position.

* * * * *